US010489145B2

(12) United States Patent
Shivanna et al.

(10) Patent No.: US 10,489,145 B2
(45) Date of Patent: Nov. 26, 2019

(54) SECURE UPDATE OF FIRMWARE AND SOFTWARE

(71) Applicant: Hewlett Packard Enterprise Development LP, Houston, TX (US)

(72) Inventors: Suhas Shivanna, Bangalore (IN); Sandeep B H, Bangalore (IN); Neena M S, Bangalore (IN); Tom L Vaden, Neshanic Station, NJ (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 151 days.

(21) Appl. No.: 15/526,937

(22) PCT Filed: Nov. 14, 2014

(86) PCT No.: PCT/US2014/065615
§ 371 (c)(1),
(2) Date: May 15, 2017

(87) PCT Pub. No.: WO2016/076880
PCT Pub. Date: May 19, 2016

(65) Prior Publication Data
US 2017/0315798 A1 Nov. 2, 2017

(51) Int. Cl.
*G06F 8/654* (2018.01)
*G06F 21/57* (2013.01)
(Continued)

(52) U.S. Cl.
CPC .............. *G06F 8/654* (2018.02); *G06F 21/57* (2013.01); *H04L 63/0823* (2013.01); *H04L 67/34* (2013.01)

(58) Field of Classification Search
CPC .......... G06F 8/564; G06F 21/57; G06F 8/654; H04L 67/34; H04L 63/0823
See application file for complete search history.

(56) References Cited

U.S. PATENT DOCUMENTS 6,976,163 B1    12/2005  Hind
7,059,452 B2 *  6/2006   Chen ..................... B62B 9/082
                                                    188/2 D
(Continued)

FOREIGN PATENT DOCUMENTS

WO    WO-2008127523    10/2008

OTHER PUBLICATIONS

International Searching Authority, "Notification of Transmittal of the International Search Report and the Written Opinion", PCT/US2014-065615, dated Jun. 29, 2015, 10 pages.
(Continued)

*Primary Examiner* — Matthew Smithers
(74) *Attorney, Agent, or Firm* — Hewlett Packard Enterprise Patent Department (57) ABSTRACT

Example implementations relate to secure update of firmware and software. For example, a method for providing secure firmware and software updates to a computing system includes receiving, by a management processor, an update request from a management station for the computing system, where the update request comprises update parameters indicative of components to be updated within the computing system. Further, the method includes storing details of the update request including the update parameters at a pre-defined memory location, where the update parameters include at least one certificate associated with the update request. The method also includes accessing, at least one of a firmware image and a software patch corresponding to the update request based on identification of the update parameters stored at the pre-defined memory location by an update manager, where the update manager has predefined access rights and privileges within an Operating System (OS) of the computing system.

20 Claims, 5 Drawing Sheets

(51) Int. Cl.
*H04L 29/06* (2006.01)
*H04L 29/08* (2006.01)

(56) References Cited

U.S. PATENT DOCUMENTS

| | | | | |
|---|---|---|---|---|
| 7,069,452 | B1* | 6/2006 | Hind | G06F 21/572 |
| | | | | 713/1 |
| 8,560,823 | B1* | 10/2013 | Aytek | G06F 8/654 |
| | | | | 713/2 |
| 8,566,613 | B2 | 10/2013 | Sakthikumar | |
| 2003/0051160 | A1 | 3/2003 | Selkirk | |
| 2005/0021968 | A1* | 1/2005 | Zimmer | G06F 21/572 |
| | | | | 713/176 |
| 2006/0143600 | A1* | 6/2006 | Cottrell | G06F 21/572 |
| | | | | 717/168 |
| 2006/0174242 | A1* | 8/2006 | Zhu | G06F 8/65 |
| | | | | 717/172 |
| 2008/0168275 | A1* | 7/2008 | De Atley | G06F 21/51 |
| | | | | 713/189 |
| 2009/0178033 | A1* | 7/2009 | Challener | G06F 9/4411 |
| | | | | 717/168 |
| 2010/0017809 | A1* | 1/2010 | Bryant-Rich | G06F 9/4411 |
| | | | | 719/327 |
| 2010/0082955 | A1* | 4/2010 | Chhabra | G06F 21/572 |
| | | | | 713/1 |
| 2011/0113181 | A1* | 5/2011 | Piwonka | G06F 8/65 |
| | | | | 711/102 |
| 2012/0054734 | A1* | 3/2012 | Andrews | G06F 8/65 |
| | | | | 717/171 |
| 2012/0072734 | A1* | 3/2012 | Wishman | G06F 21/572 |
| | | | | 713/189 |
| 2012/0311559 | A1* | 12/2012 | Clark | G06F 8/65 |
| | | | | 717/173 |
| 2013/0318357 | A1 | 11/2013 | Abraham | |

OTHER PUBLICATIONS

Nilsson, D., "Secure Firmware Updates Over the Air in Intelligent Vehicles," Department of Computer Science and Engineering Chalmers University of Technology19 May 23, 2008 5 pages.

* cited by examiner

SECURE UPDATE OF FIRMWARE AND SOFTWARE

BACKGROUND

Computing systems, for example, laptops, desktops, personal digital assistants (PDA's), servers, Internet appliances, and combinations thereof generally include different components, such as input/output (I/O) cards, Basic Input/Output System (BIOS), and device drivers. Such components generally contain a firmware, software, or any other suitable code that is executed to perform desired functionalities. Different components of the computing systems may be updated with new firmware or software from time to time. In an environment where servers are utilized to provide various functionalities, firmware or software of BIOS, I/O cards, and drivers may be frequently updated to provide the servers with most recent functionalities and capabilities.

BRIEF DESCRIPTION OF DRAWINGS

The detailed description is provided with reference to the accompanying figures. In the figures, the left-most digit(s) of a reference number identifies the figure in which the reference number first appears. The same numbers are used throughout the drawings to reference like features and components.

DETAILED DESCRIPTION

The present subject matter relates to systems and methods for providing secure firmware and software updates to computing system. Within the life time of a computing system, many new versions of software and firmware may be released by independent hardware vendors (IHVs) and original equipment manufacturers (OEMs) which may include important updates or patches. Different organizations may install such updates to keep their computing systems up-to-date with the new versions of the software and firmware. Therefore, installation of computing systems in organizations may not be a one time activity and these computing systems may have to be updated with new firmware and software from time to time.

Generally, a computing system may have many updates including, but not limited to, BIOS updates, management firmware updates, I/O firmware image updates, provider agent updates, and device driver updates. To manage such different types of updates in computing systems, management processors are generally implemented by organizations which provide out-of-band management capabilities, such as installation of new versions of firmware and software onto the computing devices without actively utilizing resources of the computing system.

While updating a computing system with new versions of firmware and software, although some of the components like BIOS and Management firmware can be updated out-of-band using the management processor; some of the other firmware updates, such as I/O card firmware update and driver software update may necessitate support of the operating system (OS) running on the computing system for completion. Accordingly, updating such components of the computing system may require access to credentials of the OS. However, sharing of OS credentials increases possible threats of malicious attacks on the computing system, thereby making the computing system vulnerable.

In some scenarios, to avoid sharing of OS credentials for the purpose of updates, and allow secure update of firmware and software, agents or software modules are deployed on the computing system. Such agents or software modules are either permanently deployed on the computing system, or are installed at the time of actual update and thereafter uninstalled. Deployment of agents on the computing system not only consumes valuable resources of the computing system, but also adds to the overall manageability overhead. Also, since the agents or software modules run with highest access privileges, such as that of a "root", the computing system is exposed to security attacks by malicious users.

According to example implementations of the present subject matter, systems and methods for providing secure firmware and software updates to computing systems are described. The described systems and methods may allow management processors to update firmware and software onto a computing system, without utilizing deployment of an external agent, or necessitating sharing of OS credentials.

The described systems and methods may be implemented in various computing systems connected through various networks. Although the description herein is with reference to computing systems of data center environment such as servers, the methods and described techniques may be implemented in other devices, albeit with a few variations. Various implementations of the present subject matter have been described below by referring to several examples.

In an example of the present subject matter, the described computing systems may be implemented in a server and may also utilize a management processor for out-of-band management services. Further, the computing systems may also be monitored and controlled by management stations which may provide various functionalities, including monitoring of firmware and software updates from time to time.

In operation, the management processor of the computing system implemented as a server in data centre environment, may receive a firmware or a software update request from a management station. For the sake of explanation, the firmware update request and the software update request, received by the management processor, have been commonly and individually referred to as an update request, hereinafter.

In one example implementation of the present subject matter, the management processor may also receive update parameters within the update request, received from the management station. The update parameters may include information related to the update of the firmware or the software necessitated on the computing system. For example, the update parameters may include details of the updates to be done, along with a location of a third party device that may host these firmware or software updates. Further, the update parameters may also include unique keys or certificates to establish a secure connection with the third party device for the purpose of accessing and downloading of these updates for single sign on operations. Furthermore, the update parameters may also include certificates based on which authenticity and validity of a firmware image or a software patch for the firmware or the software update can be confirmed.

In said example implementation, the computing system, upon receiving the update request, may store the update request along with the update parameters in a pre-defined memory location; and may generate an interrupt for an update manager of the computing system. In one implementation, the update manager may be a dedicated service running on the OS of the computing system to facilitate secure firmware and software updates. The platform independent OS service can be part of the core OS installation necessitating no additional installation of agents. In said implementation, the update manager may identify the interrupt, read the update request using the secure in-band interface, and initiate a secure download of the firmware image, or the software patch for the firmware or the software update, respectively.

It would be understood that for a firmware update, the firmware image may be utilized by the computing system; and for a software update, the software patch may be installed by the computing system.

The update manager of the computing system, may access the update parameters from the pre-defined memory location, and may accordingly download the firmware image or the software patch from the third party device securely. In one implementation of the present subject matter, the update manager may be provided with predefined access rights and privileges such that the update manager can merely download components in a secure manner, based on the update request and the update parameters. In other words, the update manager may be provided with predefined access rights and privileges such that they utilize secure OS containers like Linux OS containers to run the OS service and isolate any firmware or software update invocations.

The downloaded firmware image or the software patch may then be installed onto the computing system to update the components of the computing system. Therefore, the described methods may enable a secure firmware and software update mechanism without adding any configuration overheads. The provisioning of predefined access rights and privileges to the update manager may provide additional security to the firmware and software update mechanism. Further, since the update parameters may include unique keys or certificates for establishing a mutually authenticated secure connection with the third party devices, the computing system is not vulnerable to malicious attacks and security threats. Moreover, certificates included in the update parameters may allow validation of the downloaded firmware image or software patch for handling certification revocations more flexibly. Furthermore, since agents and third party patches are not installed for the purpose of firmware and software update, additional computing resources of the computing system are not utilized.

The above systems and methods are further described with reference to FIGS. 1(a), 1(b), 1(c), 2, and 3, It should be noted that the description and figures merely illustrate the principles of the present subject matter along with examples described herein and, should not be construed as a limitation to the present subject matter. It is thus understood that various arrangements may be devised that, although not explicitly described or shown herein, embody the principles of the present subject matter. Moreover, all statements herein reciting principles, aspects, and embodiments of the present subject matter, as well as specific examples thereof, are intended to encompass equivalents thereof.

Figure 1A:
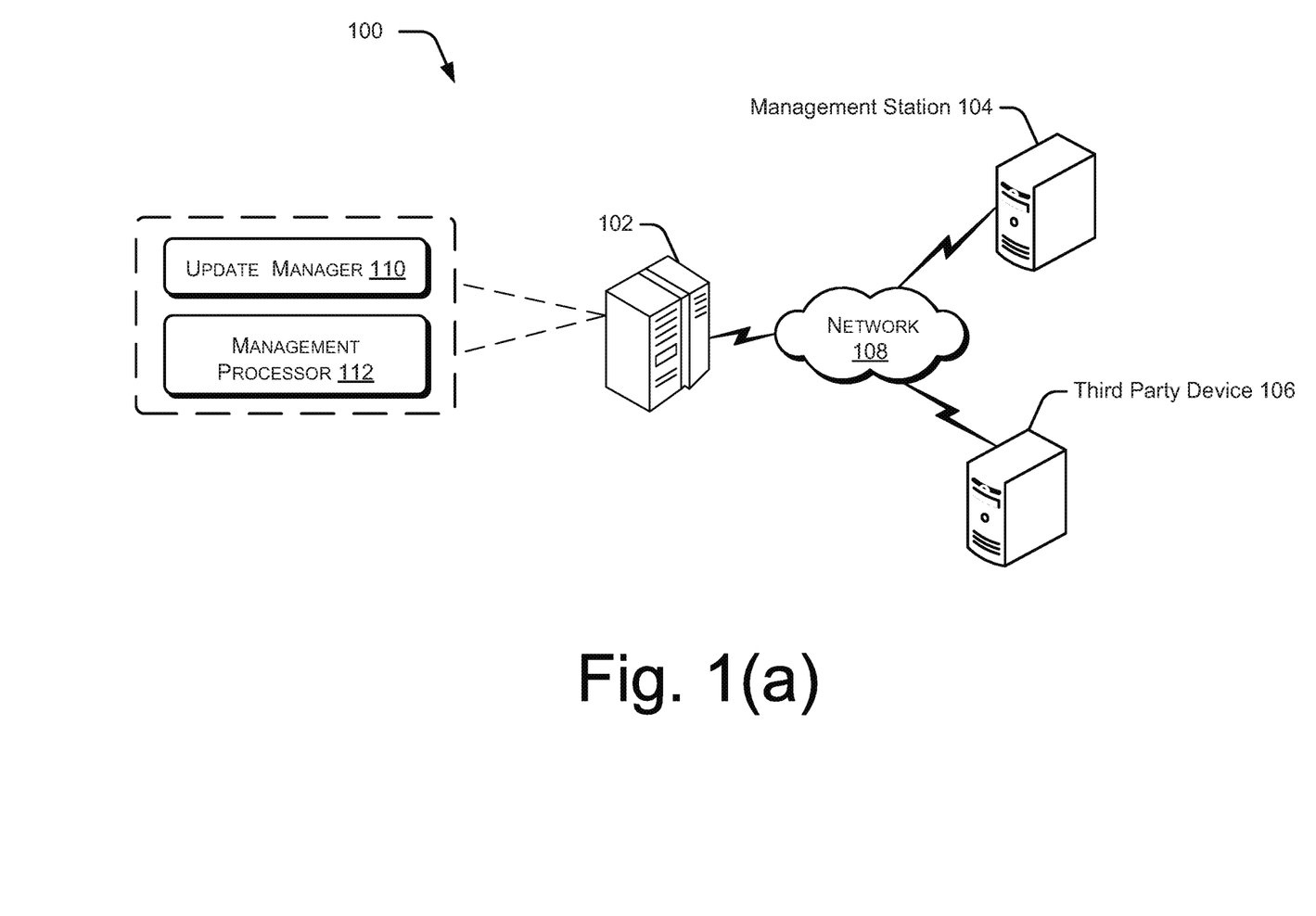
FIG. 1(a) illustrates an example computing environment, implementing a computing system for secure update of firmware and software.

FIG. 1(a) schematically illustrates a computing environment 100, implementing an example computing system 102, according to an example implementation of the present subject matter. The computing environment 100 may either be a public distributed environment or may be a private closed computing environment. According to an implementation of the present subject matter, the computing system 102 may be implemented as, but is not limited to, a server, a workstation, a computer, and the like. The computing system 102 may also be a machine readable instructions-based implementation or a hardware-based implementation or a combination thereof.

The computing system 102 may communicate with different entities of the computing environment 100, such as a management station 104 and third party device(s) 106 through a network 108. The third party devices may include various devices, such as a Centralized Component Repository (CCR). The management station 104 and the third party device(s) 106 may include, but are not restricted to, servers, workstations, desktop computers, laptops, smart phones, personal digital assistants (PDAs), tablets, virtual hosts, applications, and the like.

The network 108 may be a wireless network, a wired network, or a combination thereof. The network 108 may also be an individual network or a collection of many such individual networks, interconnected with each other and functioning as a single large network, e.g., the Internet or an intranet. The network 108 may be implemented as one of the different types of networks, such as intranet, local area network (LAN), wide area network (WAN), and such. The network 108 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The network 108 may also include individual networks, such as, but are not limited to, Global System for Communication (GSM) network, Universal Telecommunications System (UMTS) network, Long Term Evolution (LIE) network, Personal Communications Service (PCS) network, Time Division Multiple Access (TDMA) network, Code Division Multiple Access (CDMA) network, Next Generation Network (NGN), Public Switched Telephone Network (PSTN), and Integrated Services Digital Network (ISDN). Depending on the implementation, the network 108 may include various network entities, such as base stations, gateways and routers; however, such details have been omitted to maintain the brevity of the description. Further, it may be understood that the communication between the computing system 102, the management station 104, and other entities may take place based on the communication protocol compatible with the network 108.

In one example implementation, the computing system 102 may securely perform firmware and software updates based on communication with the management station 104 and the third party device(s) 106 through the network 108. In said example implementation, the computing system 102 may include a management processor 112, and an update manager 110 to communicate with the management station 104 and the third party device(s) 106, and perform secure firmware and software update.

Although the computing system 102 may perform secure update based on the elements described in the example implementation, the computing system 102 may also perform other functionalities and may include other different elements. Such example functionalities and example elements have been described in more detail in reference to FIG. 1(b).

Figure 1B:
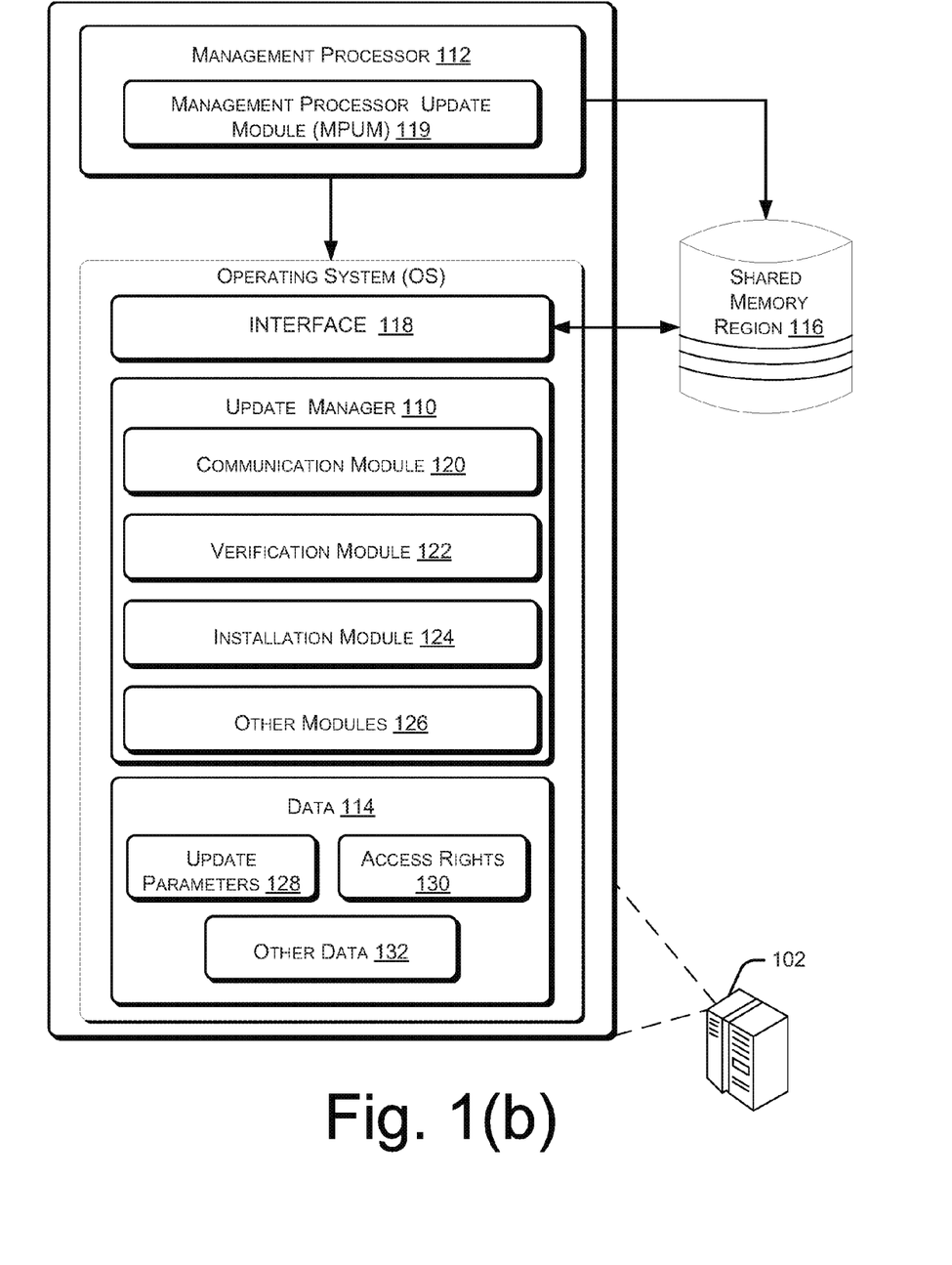
FIG. 1(b) illustrates various elements of the computing system, according to an example implementation of the present subject matter.

FIG. 1(b) schematically illustrates elements of the computing system 102, according to an example implementation of the present subject matter. In one implementation of the present subject matter, the computing system 102 may include, apart from the update manager 110 and the management processor 112, data 114 and a shared memory region (SMR) 116. Apart from the management processor 112, the computing system 102 may also include processor (s) (not shown) to run an operating system and other applications and services. The management processor 112, and the processor(s) of the computing system 102 may be implemented as microprocessor(s), microcomputer(s), microcontroller(s), digital signal processor(s), central processing unit(s), state machine(s), logic circuit(s), and/or any device(s) that manipulates signals based on operational instructions. Among other capabilities, the processor may fetch and execute computer-readable instructions stored in a memory. The functions of the various 'processor(s)' may be provided through the use of dedicated hardware as well as hardware capable of executing machine readable instructions.

The operating system (OS) of the computing system 102 may also include interface(s) 118. The interface(s) 118 may include a variety of machine readable instructions-based interfaces and hardware interfaces that allow the OS of the computing system 102 to interact with different entities, such as the management processor 112, the SMR 116, and the data 114. Further, the interface(s) 118 may enable the components of the computing system 102 to communicate with other communication and computing devices, such as the management station 104 and the third party device 106, web servers and external repositories.

Although the SMR 116 has been shown outside the computing system 102, the SMR 116 may also be implemented as a memory of the computing system 102, shared among different entities, such as the management processor 112 and the OS. The SMR 116 may be communicatively coupled to the processor(s) of the computing system 102. The SMR 116 may include any computer-readable medium including, for example, volatile memory (e.g., RAM), and/or non-volatile memory (e.g., EPROM, flash memory, Memristor, etc.). The SMR 116 maybe communicatively coupled to the management processor 112 and different components of the OS, through one or more secure in-band interface using widely accepted industry standard protocols. In one example implementation, the interface 118 may include sideband interfaces to facilitate secure in-band communication between the management processor 112, the components of the OS, and the SMR 116.

In one example implementation of the present subject matter, the management processor 112 and the update manager 110 may include different module(s). The module(s) along with the update manager 110 may be communicatively coupled to the processor(s) of the computing system 102. The module(s), amongst other things, include routines, services, programs, objects, components, data structures, and the like, which perform particular tasks or implement particular abstract data types. The module(s) further include modules that supplement applications on the computing system 102, for example, services of the operating system.

The data 114 serves, amongst other things, as a repository for storing data that may be fetched, processed, received, or generated by the module(s) of the update manager 110. Although the data 114 is shown internal to the computing system 102, it may be understood that the data 114 may reside in an external repository (not shown), which may be communicatively coupled to the computing system 102. The computing system 102 may communicate with the external repository through the interface(s) 118 to obtain information from the data 114.

In an implementation, the management processor 112 of the computing system 102 may include a management processor update module (MPUM) 119, and the update manager 110 of the computing system 102 includes a communication module 120, a verification module 122, an installation module 124, and other module(s) 126. In an implementation, the data 114 of the computing system 102 includes update parameters 128, access rights 130, and other data 132. The other module(s) 126 may include programs or coded instructions that supplement applications and functions, for example, programs in the OS of the computing system 102, and the other data 132 fetched, processed, received, or generated by the other module(s) 126.

The following description describes the computing system 102 communicating with the management station 104 and the third party devices 106 for the purpose of firmware and software updates of the various components of the computing system 102. In one example implementation, the various components of the computing system 102 that may be updated from time to time may include, but not limited to, input/output (I/O) cards, Basic Input/Output System (BIOS), and device drivers. Further, the described techniques for secure update of the firmware and software have been made in reference to updates which necessitate support of the OS running on the computing system 102. However, it will be understood that the concepts thereto may be extended to other out-of-band updates of the computing system 102 as well In one implementation of the present subject matter, the MPUM 119 of the management processor 112 may receive an update request from the management station 104. The update request may indicate to the MPUM 119 that an update is necessitated for one or more components of the computing system 102. As described earlier, the management station 104 may be a computing device for monitoring and controlling updates of various components of the computing system 102, from time to time.

The management station 104 may be pre-configured with the updates based on components of the computing system 102 and the updates provided by vendors OEMs. Further, the management station 104 may also include different update policies defined by administrators for the purpose of updating components of one or more computing systems, such as the computing system 102. In one example, management station 104 like Hewlett Packard's OneView and Smart Update Manager (SUM) may be implemented as the management station 104 for controlling and managing firmware and software updates for the computing system 102.

In one example implementation, the MPUM 119, upon receiving the update request, may validate the management station 104 using either a local database, or Lightweight Directory Access Protocol (LDAP) service. Once the management station 104 is authenticated, the MPUM 119 may check if the credentials of the management station 104 are provided with privileges to request an update of components on the computing system 102. In another example implementation, the communication between the management station 104 and the MPUM 119 of the management processor 112 may be more secured by a multi-factor authentication.

In one implementation of the present subject matter, the MPUM 119 may receive, along with the update request, update parameters associated with the update request. The update parameters may indicate the details about the updates to be performed on the components of the computing system 102. For example, the update parameters may describe the specific components which have to be updated on the computing system 102. For example, the update parameter may define three different device drivers and one IO card firmware image which have to be updated. Further, the update parameters may also define a location from where the firmware image or the software patch can be retrieved for installation.

In one example, the update request received by the MPUM 119 may merely indicate availability of firmware and software updates for components of the computing system 102, and may not include the firmware image, or the software patch. The firmware image, or the software patch associated with the update request may be located and hosted by some other third party device 106, such as a centralized component repository (CCR).

In yet another example, the update request received from the management station 104 may include the firmware image, or the software patch. In such situations, the management processor 112 may receive, along with the update request, the firmware image, or the software patch to be installed onto the different components of the computing system 102.

For the sake of explanation, the forthcoming description is described considering that the update request merely indicate availability of firmware and software updates for components of the computing system 102, and does not include the firmware image, or the software patch. In such situations, the update parameters may also include a location of the third party device 106, such as an Internet Protocol (IP) address, from where the firmware image or the software patch can be securely accessed. Further, the update parameters may also include a unique key or a certificate (digital) to establish a secure connection with the third party device and download the necessary firmware image or the software patch. Furthermore, the update parameters may also include certificates based on which authenticity and validity of the firmware images or the software patches, for the firmware or the software update, can be confirmed.

The MPUM 119, upon validating the update request and receiving the update parameters, may store the update request at a pre-determined memory location, such as the SMR 116. Therefore, the SMR 116 may be updated with the update request to install firmware or software updates on the computing system 102. As described earlier, the SMR 116 may be a shared memory location which may be jointly accessible by the OS of the computing system 102 and the management processor 112 along with the MPUM 119.

For the purpose of security, the SMR 116 may not be accessible by any other entity of the computing environment 100, apart from the management processor 112 and the OS of the computing system 102. Further, although the SMR 116 has been shown external to the computing system 102, the SMR may also be included within the computing system 102 can be a primary or a secondary memory of the computing system 102. In one implementation, the management processor 112, along with the update request, may also store the update parameters within the SMR 116. In another implementation, the SMR 116 may be a protected memory region accessible only to the management processor 112. Any request to access the data in the SMR 116 may be performed using an industry standard in-band interface and protocols, like Intelligent Platform Management Interface (IPMI).

The MPUM 119, upon updating the SMR 116 with the update request, may generate an interrupt for the update manager 110 of the computing system 102. The interrupt may be a general purpose event generated based on industry standard interfaces, such as an Advanced Configuration and Power Interface (ACPI) interface. The interrupt may signal the update manager 110 that a new firmware or software update request is pending for the components of the computing system 102. Depending on the technology implemented, it would be appreciated that the form of the interrupt may vary and the interface utilized may change.

In one example implementation of the present subject matter, the update manager 110 may identify the interrupt. In particular, the communication module 120 within the update manager 110 may identify the interrupt. Based on the identification of the interrupt, the communication module 120 may query the pre-defined memory location, such as the SMR 116 and process the pending update request. The communication module 120 may access the update parameters from the SMR 116 and identify the location of the third party device 106 from which the firmware image or the software patch can be accessed. The accessed update parameters may be stored within the data 114 as the update parameters 128.

The SMR 116 may either be securely accessed using shared memory semantics, or in situations where the SMR 116 is protected, the communication module 120 within the update manager 110 may request the management processor 112 to provide the data in SMR 116 using industry standard commands, such as IPMI commands, through the secure sideband interfaces.

The third party device 106 may be a CCR hosting the firmware image or the software patch necessitated for the update of components of the computing system 102. The CCR can be understood to be a trusted entity capable of establishing a secure connection with the communication module 120 of the computing system 102. In one implementation, the management station 104 may itself act as the CCR and may host the firmware image or the software patch necessitated for the update of the components.

The communication module 120, upon establishing a secure connection with the third party device 106, may validate the connection based on unique keys or digital certificates included in the update parameters. Further, upon establishment of a secure connection, the communication module 120 may also download the firmware image or the software patch associated with the update request.

In one example implementation of the present subject matter, the verification module 122 may validate the downloaded firmware image or the software patch based on certificates included in the update parameters. For instance, the certificates may be matched with the signature included within the downloaded firmware image or the software patch for the purpose of verification. Similarly, the certificate may also include a hash value which may be verified by computing a hash of the downloaded firmware image or the software patch. Therefore, the verification module 122 may perform the validation of the downloaded firmware image or the software patch based on different techniques.

Once the verification is completed, the installation module 124 may install the downloaded firmware image or the software patch to update the different components of the computing system 102. It would be appreciated that a firmware image may be flashed onto ROM of the component that is to be updated and software patch may be installed onto the drivers of the components, by the installation module 124.

In one implementation, the update manager 110 may be implemented as a service of the OS of the computing system 102 and may be provided with predefined access rights and privileges. For example, the communication module 120 of the update manager 110 may be provided with limited communication access to the pre-defined memory location, such as the SMR 116, and the third party devices 106 hosting the firmware images and software patches, as defined by the update parameters. Similarly, the installation module 124 of the update manager 110 may merely be provided with privileges to install verified and authenticated firmware images or software patches on selected devices. The access rights and privileges of the update manager 110 and its various components may be defined by an administrator or at design time by a design or configuration team and may be stored within the data 114 as the access rights 130.

As described earlier, the update request, apart from including the update parameters, may also include the firmware image and the software patch to be utilized for the update of the components. In such an example implementation, the management processor 112 may store the firmware image and the software patch onto the pre-defined memory location, as the SMR 116, along with the update request and the update parameters. The update manager 112, in such example, may directly access the firmware image and the software patch from the SMR 116. Therefore, the communication module 120 may not have to establish a connection with an external third party device, and the update of software and firmware can be completed.

Figure 1C:
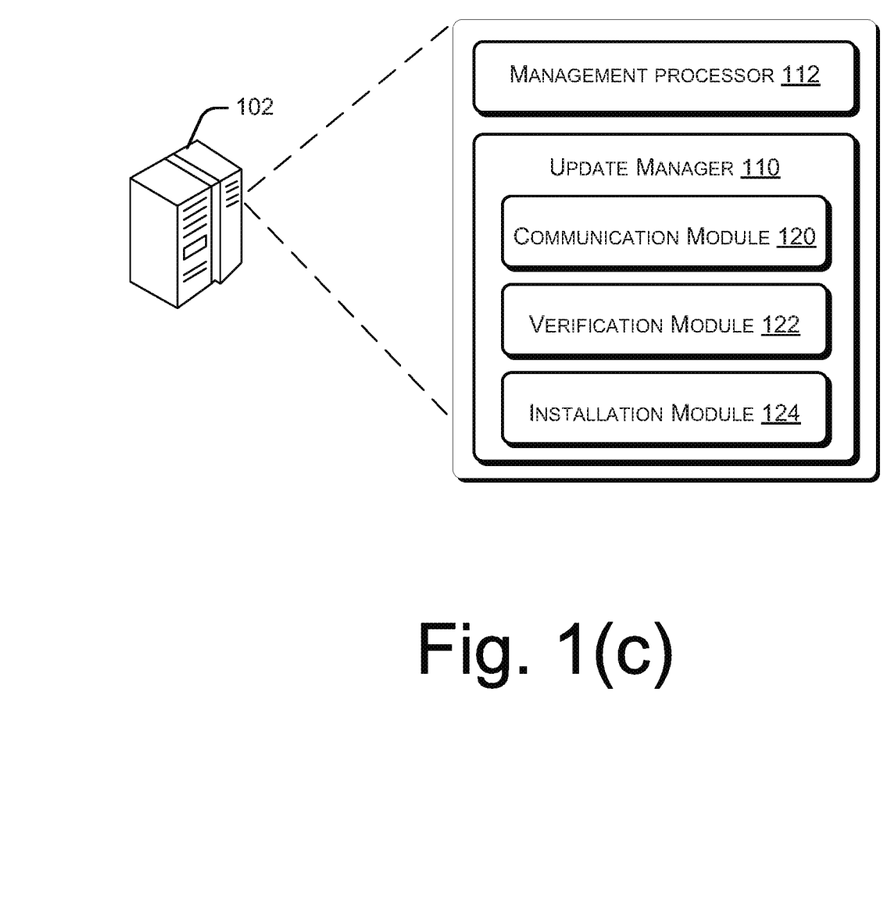
FIG. 1(c) illustrates elements of the computing system, according to another example implementation of the present subject matter.

FIG. 1(c) schematically illustrates elements of the computing system 102, according to another example implementation of the present subject matter. The computing system 102 may include the management processor 112 and the update manager 110. The update manager 110 may include the communication module 120, the verification module 122, and the installation module 124.

In one example implementation of the present subject matter, the management processor 112 of the computing system 102 may receive update request to update components of the computing system 102. The management processor 112 may store the update request at a pre-defined memory location for the update manager 110. Further, the management processor 112 may also generate an interrupt for the update manager to indicate a pending update request.

The update manager 110 may identify the interrupt generated by the management processor 112 and may access the firmware images or the software patches. The verification module 122 configured to run with predefined privileges, like the update manager 110 may verify the firmware images or software patches based on certificates associated with the update request to ensure authenticity and validity of the firmware images or software patches. Further, the installation module 124 configured to run with predefined privileges using OS features like secure application security containers may install the validated and authenticated firmware images or software patches to update one or more components of the computing system 102. It would be appreciated that the update manager 110 and its components may be provided with predefined access rights and privileges such that they utilize secure OS containers like Linux OS containers to run the OS service and isolate any firmware or software update invocations.

Figure 2:
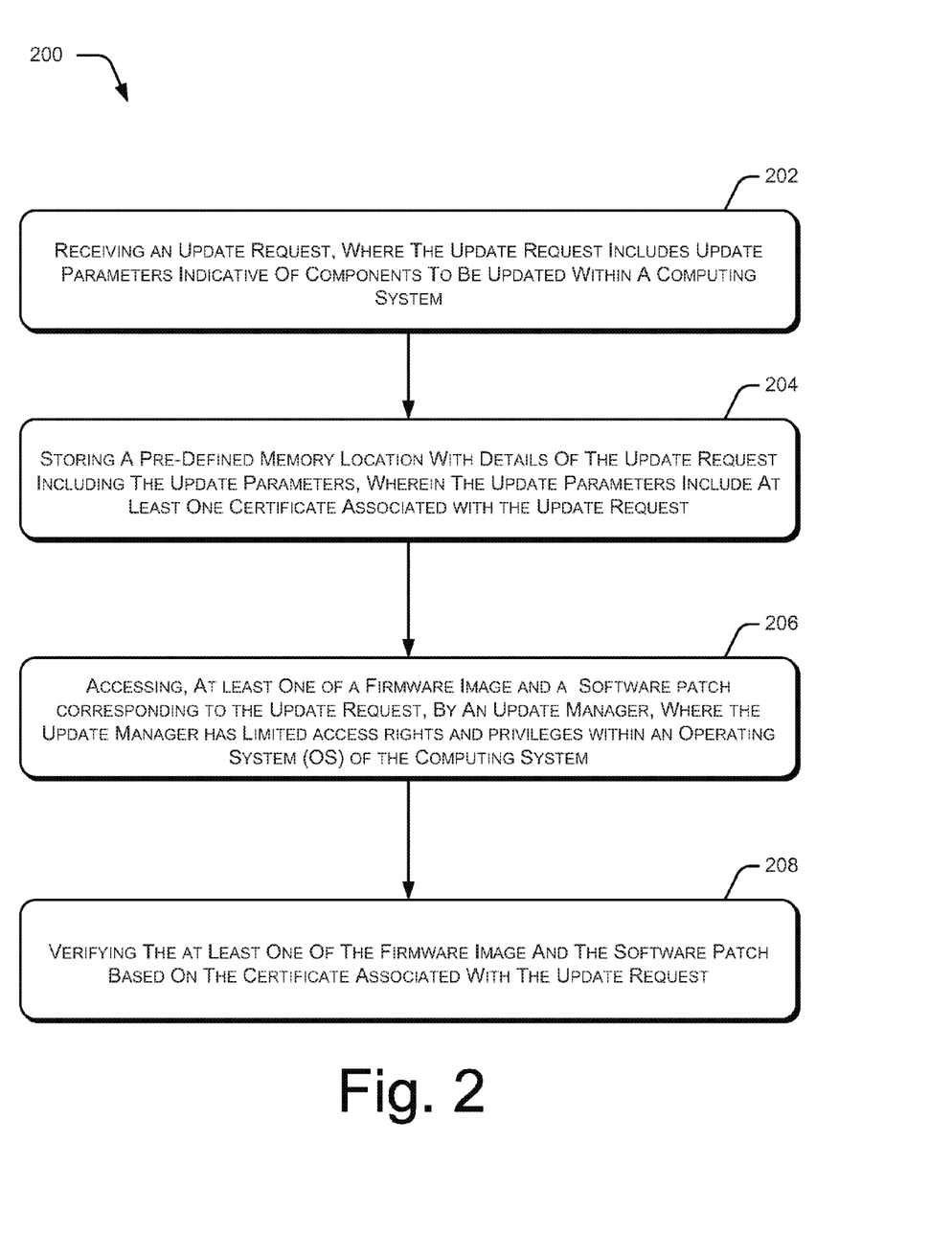
FIG. 2 is a flowchart representative of an example method of secure firmware and software update by a computing system.

FIG. 2 illustrates a method 200 for providing secure firmware and software updates to computing system. The order in which the method 200 is described is not intended to be construed as a limitation, and any number of the described method blocks may be combined in any order to implement the method 200, or an alternative method. Furthermore, the method 200 may be implemented by processor (s) or computing system(s) through any suitable hardware, non-transitory machine readable instructions, or combination thereof.

It may be understood that steps of the method 200 may be performed by programmed computing systems. The steps of the methods 200 may be executed based on instructions stored in a non-transitory computer readable medium, as will be readily understood. The non-transitory computer readable medium may include, for example, digital memories, magnetic storage media, such as one or more magnetic disks and magnetic tapes, hard drives, or optically readable digital data storage media.

Further, although the method 200 may be implemented in a variety of computing systems of a computing environment; in an embodiment described in FIG. 2, the method 200 is explained in context of the aforementioned computing system 102, for ease of explanation.

Referring to FIG. 2, in an implementation of the present subject matter, at block 202, an update request is received. The update request may indicate a firmware or a software update for one or more components of the computing system. In one example implementation, the update request may include update parameters indicative of components to be updated within a computing system. The update parameters may include details of the updates to be done, along with a location of a third party device that may host these firmware or software updates. Further, the update parameters may also include unique keys to establish a secure connection with the third party device for the purpose of accessing and downloading of these updates. Furthermore, the update parameters may also include certificates based on which authenticity and validity of a firmware image or a software patch for the firmware or the software update can be confirmed.

At block 204, details of the update request including the update parameters are stored at a predefined memory location. In one example, the update parameters may include at least one certificate associated with the update request. The certificate may allow verification of firmware images and software patches to be installed onto the computing system for update of the one or more components. The pre-defined memory location may be a shared memory region within the primary or the secondary memory of the computing system 102. Further, the pre-defined memory locations may also be a remote storage location which may be accessible to the entities of the computing system 102.

At block 206, at least one of a firmware image and a software patch is accessed, corresponding to the update request, by an update manager. The update manager may have predefined access rights and privileges within an operating system (OS) of the computing system 102. Therefore, with limited access, the update manager 110 may access at least one of the firmware image and the software patch.

At block 208, the at least one of the firmware image and the software patch may be verified. The verification may be done by the update manager based on the certificate associated with the update request.

Figure 3:
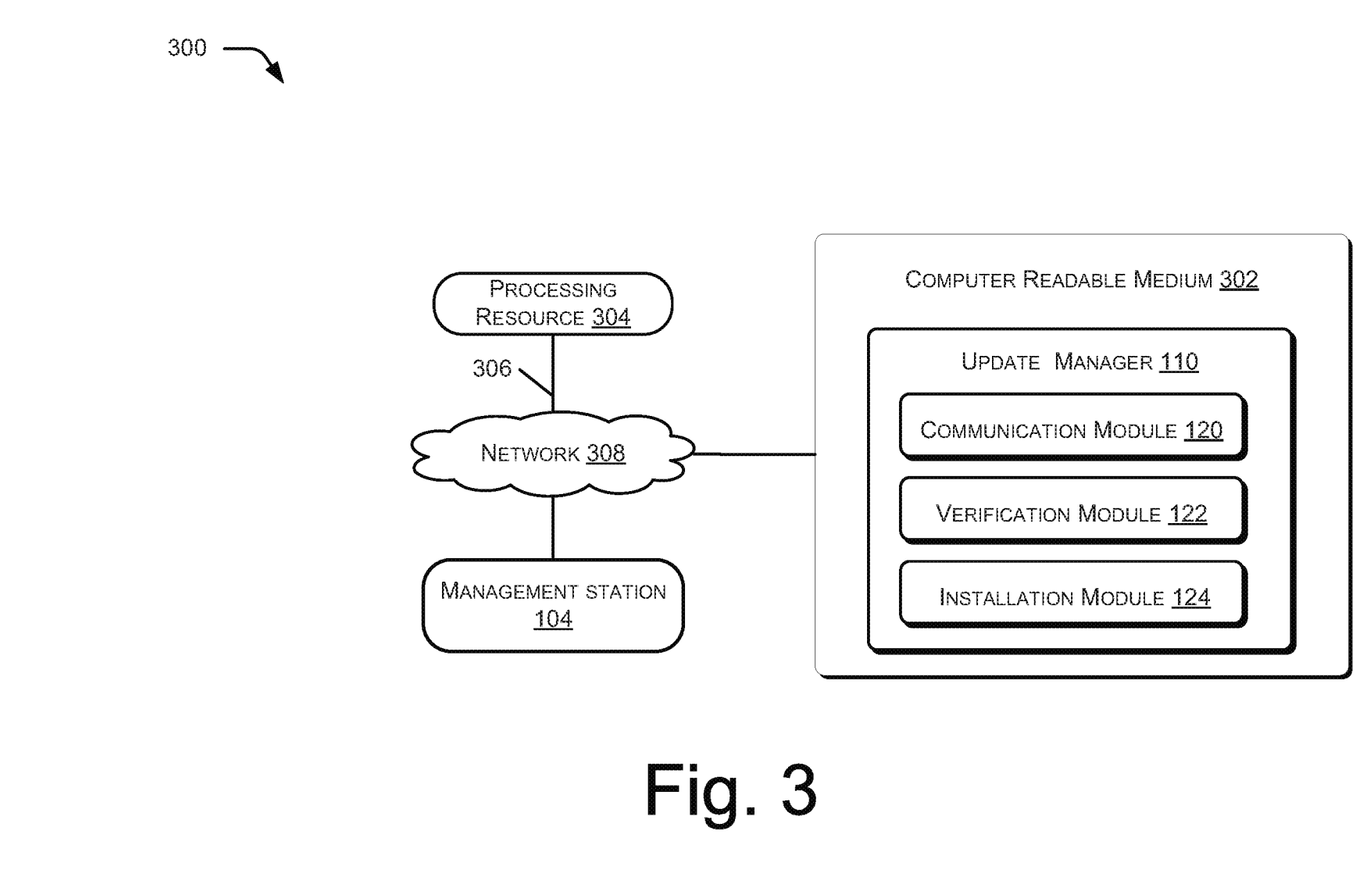
FIG. 3 illustrates an example computing environment, implementing a non-transitory computer-readable medium for secure update of firmware and software in a computing system.

FIG. 3 illustrates a computing environment 300 implementing a non-transitory computer-readable medium 302, according to an implementation of the present subject matter. In one implementation, the non-transitory computer readable medium 302 may be utilized by a computing system, such as the computing system 102 (not shown). The computing system 102 may be implemented in a public networking environment or a private networking environment. In one implementation, the heterogeneous distributed system 300 includes a processing resource 304 communicatively coupled to the non-transitory computer readable medium 302 through a communication link 306 connecting to a network 308.

For example, the processing resource 304 may be implemented in a computing system, such as the computing system 102 described earlier. The computer readable medium 302 may be, for example, an internal memory device or an external memory device. In one implementation, the communication link 306 may be a direct communication link, such as any memory read/write interface. In another implementation, the communication link 306 may be an indirect communication link, such as a network interface. In such a case, the processing resource 304 may access the computer readable medium 302 through the network 308. The network 308 may be a single network or a combination of multiple networks and may use a variety of different communication protocols.

The processing resource 304 and the computer readable medium 302 may also be communicating with management station 104 over the network 308, The management station 104 may include, for example, servers, desktop computers, laptops, smart phones, PDAs, and tablets. The data sources 310 have applications that communicate with the processing resource 304, in accordance with the present subject matter.

In one implementation, the computer readable medium 302 includes a set of computer readable instructions, such as the update manager 110, including the communication module 120, the verification module 122, and the installation module 124. The set of computer readable instructions may be accessed by the processing resource 304 through the communication link 306 and subsequently executed to process data communicated with the management station 104.

For example, the computing system 102 may receive update request to update one or more of its components from the management station 104. The processing resource 304 may store the update request at a pre-defined memory location for the update manager 110. Further, the processing resource 304 may also generate an interrupt for the update manager 110 to indicate a pending update request.

The update manager 110 may identify the interrupt generated by the processing resource 304 and may access the firmware images or the software patches. The verification module 122 may verify the firmware images or software patches based on certificates associated with the update request to ensure authenticity and validity of the firmware images or software patches. Further, the installation module 124 may install the validated and authenticated firmware images or software patches to update one or more components of the computing system 102.

Therefore, the described methods may enable a secure firmware and software update mechanism without adding any configuration overheads. The provisioning of predefined access rights and privileges to the update manager 110 may provide additional security to the firmware and software update mechanism. Further, since the update parameters may include unique keys for establishing a secure connection with the third party devices, the computing system is not vulnerable to malicious attacks and security threats. Moreover, certificates included in the update parameters may allow validation of the downloaded firmware image or software patch. Furthermore, since agents and third party patches are not installed for the purpose of firmware and software update, additional computing resources of the computing system are not utilized.

Although implementations of present subject matter have been described in language specific to structural features and/or methods, it is to be understood that the present subject matter is not necessarily limited to the specific features or methods described. Rather, the specific features and methods are disclosed and explained in the context of a few implementations for the present subject matter.

What is claimed is:

1. A method comprising:
receiving, by a management processor of a computing system, an update request for the computing system, from a management station over a network, wherein
the update request includes update parameters indicative of components to be updated within the computing system, and
the update parameters include at least one certificate associated with the update request;
storing, by the management processor, details of the update request and the update parameters at a pre-defined memory location;
signaling, by the management processor, presence of the update request to an update manager within an operating system (OS) executed by a first processor that is separate from the management processor;
accessing, by the update manager executed by the first processor that is separate from the management processor and responsive to the signaling, a program code update corresponding to the update request based on identification of the update parameters stored at the pre-defined memory location by the update manager, wherein the update manager has predefined access rights and privileges within the OS; and
verifying, by the update manager, the program code update based on the at least one certificate associated with the update request.

2. The method of claim 1, wherein the signaling comprises generating an interrupt to indicate a pending program code update corresponding to the update request.

3. The method of claim 2, wherein the accessing comprises:
identifying, by the update manager, the interrupt corresponding to the update request;
determining, by the update manager, a location of the program code update based on the update parameters stored at the pre-defined memory location; and
downloading, by the update manager, the program code update from the determined location based on the at least one certificate associated with the update request.

4. The method of claim 1, wherein the pre-defined memory location is a shared memory region (SMR) of the computing system, and wherein the SMR is accessible to the management processor and the update manager.

5. The method of claim 4, wherein the SMR is accessed using at least one of shared memory semantics and industry standard commands, sent over a sideband interface connecting the update manager and the management processor.

6. The method of claim 1, wherein the update manager is a service of the OS of the computing system with the predefined access rights and privileges.

7. The method of claim 6, wherein the update manager is part of an installation of the OS in the computing system.

8. The method of claim 1, further comprising installing the program code update onto the computing system.

9. The method of claim 8, wherein the update manager utilizes a secure OS container to perform the installing of the program code update onto the computing system.

10. The method of claim 1, wherein the program code update comprises at least one of a firmware image or a software patch.

11. The method of claim 1, wherein the management processor enables an out-of-band update of the computing system over the network using the program code update.

12. A computing system comprising:
a first processor;
a management processor separate from the first processor and to:
receive an update request for the computing system from a management station over a network, wherein the update request comprises update parameters indicative of components to be updated within the computing system, and
the update parameters include at least one certificate associated with the update request;
store the update request along with the update parameters at a pre-defined memory location; and
generate an interrupt corresponding to the update request to indicate a pending update for the components of the computing system;
an update manager that is part of an operating system (OS) executable on the first processor, the update manager comprising predefined access rights and privileges within the OS, the update manager executable on the first processor to:
identify the interrupt corresponding to the update request;
access the pre-defined memory location to determine a location of a program code update based on the update parameters; and
download the program code update from the determined location based on the at least one certificate included in the update parameters associated with the update request.

13. The computing system of claim 12, wherein the pre-defined memory location is at least one of a primary memory or a secondary memory of the computing system, wherein the pre-defined memory location is accessible to the management processor and the update manager.

14. The computing system of claim 12, wherein the update manager is executable on the first processor to verify the program code update based on the certificate associated with the update request.

15. The computing system of claim 12, wherein the update manager comprises an installation module to install the program code update onto the computing system.

16. The computing system of claim 12, wherein the pre-defined memory location is a shared memory region (SMR) of the computing system, and wherein the SMR is accessible to the management processor and the update manager.

17. The computing system of claim 12, wherein the update manager is a service of the OS of the computing system and is a part of OS installation with the predefined access rights and privileges, and wherein the service is run in secured OS application containers.

18. A non-transitory computer-readable medium comprising instructions that upon execution cause a computing system to:
cause a management processor to receive an update request for the computing system from a management station over a network, wherein
the update request includes update parameters indicative of components to be updated within the computing system and
the update parameters include at least one certificate associated with the update request;
cause the management processor to store the update request along with the update parameters at a pre-defined memory location;
cause the management processor to signal presence of the update request to an update manager within an operating system (OS) executed by a first processor that is separate from the management processor;
cause the update manager executed on the first processor to access, in response to the signaling, the pre-defined memory location to determine a location of a program code update based on the update parameters; and
cause the update manager to download the program code update from the determined location based on the certificate included in the update parameters associated with the update request.

19. The non-transitory computer-readable medium of claim 18, wherein the instructions are to further:
cause the update manager to verify the program code update based on the certificate associated with the update request; and
cause the update manager to install the program code update onto the computing system.

20. The non-transitory computer-readable medium of claim 19, wherein the update manager utilizes a secure OS container to perform the installing of the program code update onto the computing system.

* * * * *